No. 788,062.

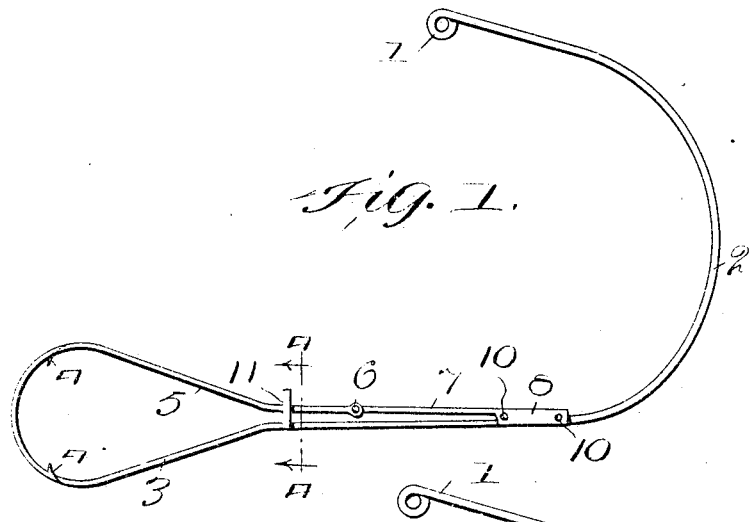
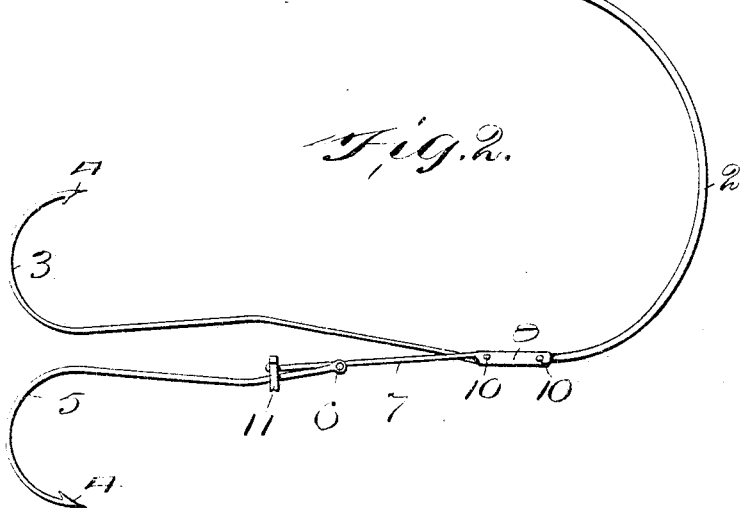
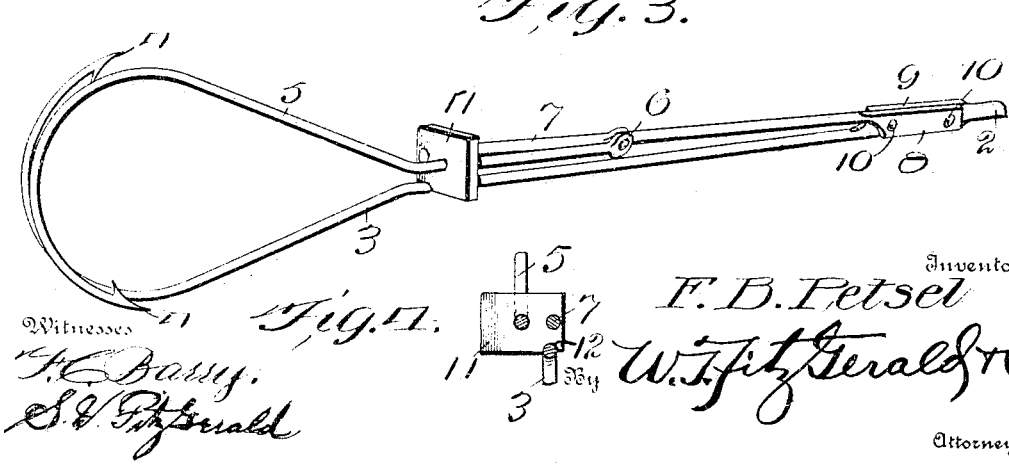
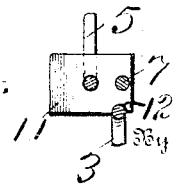

Patented April 25, 1905.

UNITED STATES PATENT OFFICE.

FRANK BENEDICT PETSEL, OF IOWA CITY, IOWA.

FISH-HOOK.

SPECIFICATION forming part of Letters Patent No. 788,062, dated April 25, 1905.

Application filed December 29, 1904. Serial No. 238,793.

*To all whom it may concern:*

Be it known that I, FRANK BENEDICT PETSEL, a citizen of the United States, residing at Iowa City, in the county of Johnson and State of Iowa, have invented certain new and useful Improvements in Fish-Hooks; and I do hereby declare the following to be a full, clear, and exact description of the invention, such as will enable others skilled in the art to which it appertains to make and use the same.

My invention relates to new and useful improvements in fish-hooks; and it consists of certain novel features of combination and construction of parts, the preferred form whereof will be hereinafter clearly set forth, and pointed out in the claims.

The main object of my invention, among others, is to provide a hook which will be reliably efficient in character and which will securely engage the fish, so that it will be impossible for it to casually slip off the same.

A further object of my invention is to prevent the hook from becoming entangled with the line, inasmuch as the points or barbs are so disposed as to present no obstruction.

Other objects and advantages will be hereinafter made clearly apparent, reference being had to the accompanying drawings, which are to be considered a part of this application, and in which—

Figure 1 shows my invention complete in a folded condition. Fig. 2 shows a similar view with my fish-hook in an open position. Fig. 3 shows a perspective detail view of my invention ready for use, while Fig. 4 shows a sectional view of Fig. 1 on a slightly-enlarged scale and as taken on line 4 4 of said view.

For convenience of description the various details and coöperating accessories of my invention will be designated by numerals, the same numeral applying to a similar part throughout the several views, and referring to the numerals on the drawings, 1 indicates the loop-terminal of the wire 2, which is fashioned at its other end so as to form the hook 3 with the barb 4 of the usual or any preferred construction, and I place in coöperation with said hook 3 a similar hook 5, having a barb 4 corresponding to the barb upon the hook 3. The hook 5 is pivotally connected, as indicated by the numeral 6, to the arm 7, said arm being flattened at its end, as indicated by the numeral 8, whereby it may be secured to a similarly-flattened portion 9 of the wire 2, suitable rivets 10 being employed to hold the said flattened portions together, as is more clearly brought out in Fig. 3.

Upon the free end of the arm 7 I dispose what I shall term the "torsion-plate" 11, having near one corner a recess 12, said recess being designed to receive at certain times the contiguous part of the hook 3. It will be understood that the torsion-plate is pivotally mounted both upon the end of the arm 7 and upon the stem of the hook 5, so that said plate will be free to turn partly around upon both of said members.

By reference to Fig. 2 it will be observed that both the hooks are released and stand out from each other; but when said hooks are brought to occupy the position shown in Fig. 1 it will cause the torsion-plate 11 to partially rotate upon the hook 5 and upon the end of the arm 7, so that the recess 12 in the corner of the plate will be turned downward so as to receive a contiguous part of the hook 3, thereby disposing the hooks 3 and 5 closely together, as shown in Figs. 1 and 3. It is therefore obvious that when said hooks are thus disposed the slightest strain upon the torsion-plate 11 will cause it to slightly rotate, and thereby release the hook 3 from the recess 12, and as the arm 7 is made of suitable spring metal the hooks will be moved apart or separated to the extent shown in Fig. 2 of the drawings and also incidentally insure that the barbs or points 4 will take into any object, as the mouth of a fish, and prevent casual loss thereof. As the shank of the hook 5 moves in an arc of a circle about the end of the arm 7, the pivotal union between the hook 5 and the arm 7 is more or less loosely formed to freely permit the required movement between said parts.

The parts of my invention may be cheaply and expeditiously manufactured of any suitable material and any desired size, and while I have described the preferred combination and construction of parts I desire to comprehend in this application all substantial equivalents and substitutes.

Having thus fully described my invention, what I claim as new, and desire to secure by Letters Patent, is—

1. The herein-described fish-hook, comprising the combination of the hook 3 having an elongated stem and line-engaging member 1, of an arm 7 secured thereto; a hook pivoted near the end of said arm; a torsion-plate movably mounted upon said hook and the end of said arm whereby said plate will turn upon both of said members, said plate also having a corner-recess 12 whereby when the plate is turned upon the members 5 and 7 the hook 3 may be engaged in said recess and released therefrom by a slight strain, all combined substantially as specified and for the purpose set forth.

2. In a fish-hook, the combination with a hook having an elongated stem and a line-engaging member, of a spring-actuated arm secured to said stem; a hook pivoted to said arm near the free end thereof and means rotatably mounted upon the free end of said arm adapted to hold said hooks closed when desired, as set forth.

3. In a fish-hook, the combination with a hook having an elongated stem, of a spring-arm secured to said stem; an additional hook loosely pivoted to said arm and a plate rotatably secured to the free end of said arm adapted to engage and retain said hooks in their closed positions, as set forth.

4. In a fish-hook, a main hook; an arm secured thereto; an auxiliary hook pivotally secured to said arm and a plate rotatably secured to said arm and adapted to engage said main and auxiliary hooks and secure them in a closed position, all combined substantially as specified and for the purpose set forth.

In testimony whereof I have signed my name to this specification in the presence of two subscribing witnesses.

FRANK BENEDICT PETSEL.

Witnesses:
M. A. SPELLANE,
A. C. HOLBERT.